(12) United States Patent
Ankenman

(10) Patent No.: US 7,942,210 B2
(45) Date of Patent: May 17, 2011

(54) CHAIN REEL FOR TILLAGE IMPLEMENT AND METHOD

(75) Inventor: Thomas W. Ankenman, Hutchinson, KS (US)

(73) Assignee: Krause Corporation, Hutchison, KS (US)

( * ) Notice: Subject to any disclaimer, the term of this patent is extended or adjusted under 35 U.S.C. 154(b) by 0 days.

(21) Appl. No.: 12/895,584

(22) Filed: Sep. 30, 2010

(65) Prior Publication Data

US 2011/0017481 A1     Jan. 27, 2011

Related U.S. Application Data

(63) Continuation of application No. 12/563,913, filed on Sep. 21, 2009, now abandoned, which is a continuation of application No. 12/051,420, filed on Mar. 19, 2008, now Pat. No. 7,594,546.

(60) Provisional application No. 60/896,695, filed on Mar. 23, 2007.

(51) Int. Cl.
*A01B 13/02* (2006.01)
(52) U.S. Cl. ........................ 172/540; 172/701
(58) Field of Classification Search .......... 56/6, 7, 56/12.7, 13.6, 15.9, 249, 504; 172/39–57, 172/91, 96, 540, 650, 552, 276, 121, 690, 701
See application file for complete search history.

(56) References Cited

U.S. PATENT DOCUMENTS

| | | | | | |
|---|---|---|---|---|---|
| 1,591,396 | A | * | 7/1926 | Mills | 171/53 |
| 3,167,132 | A | * | 1/1965 | Bucher | 171/27 |
| 3,704,575 | A | * | 12/1972 | Daniel et al. | 56/12.7 |
| 4,260,027 | A | * | 4/1981 | Langan | 172/45 |
| 5,797,460 | A | * | 8/1998 | Parker et al. | 172/151 |
| 6,068,061 | A | * | 5/2000 | Smith et al. | 172/139 |
| 6,681,868 | B2 | * | 1/2004 | Kovach et al. | 172/701 |
| 7,065,945 | B2 | * | 6/2006 | Hurtis | 56/249.5 |
| 7,156,186 | B2 | * | 1/2007 | Knobloch et al. | 172/701 |

* cited by examiner

*Primary Examiner* — Robert E Pezzuto
(74) *Attorney, Agent, or Firm* — Hovey Williams LLP

(57) ABSTRACT

In lieu of rigid bars, a tillage reel utilizes a number of elongated flexible elements such as lengths of link chain that are spaced circumferentially around the reel and extend axially thereof. The flexible elements bow outwardly by centrifugal force as the reel rolls along the ground during tillage operations to impact and fracture clods encountered at the lower front extremity of the reel. When the reel is used in connection with strip till operations, the flexible elements bow upwardly and inwardly along the lower periphery of the reel as they engage and conform to the transverse cross-section of the strip till berm, thereby avoiding destruction of the berm notwithstanding the clod-pulverizing action provided by the flexible elements.

19 Claims, 7 Drawing Sheets

CHAIN REEL FOR TILLAGE IMPLEMENT AND METHOD

RELATED APPLICATIONS

The present application is a continuation of identically titled, co-pending U.S. patent application Ser. No. 12/563,913, filed Sep. 21, 2009, which is a continuation of prior U.S. patent application Ser. No. 12/051,420, filed Mar. 19, 2008, now U.S. Pat. No. 7,594,546, which claims the priority benefit, with regard to all common subject matter, of earlier-filed U.S. Provisional Patent Application No. 60/896,695, filed Mar. 23, 2007, and titled "CHAIN REEL FOR TILLAGE IMPLEMENT." The identified earlier-filed applications are hereby incorporated by reference in their entirety into the present application.

TECHNICAL FIELD

The present application relates to tillage tools and, more particularly, to a special ground-engaging tillage reel useful in breaking up surface clods and pulverizing the soil such as when preparing a seed bed.

BACKGROUND AND SUMMARY

Tillage reels are well known in the art and have typically been used in field finishing operations to reduce clod size and smooth the surface of the ground to prepare a suitable seed bed. Conventional reels are typically provided with a cage-like construction comprising two or more axially spaced bulkheads or wheels that are spanned by a plurality of rigid bars spaced circumferentially around the periphery of the reel. The bars extend generally parallel to the axis of rotation of the reel and serve to impact and break up surface clods as the reel is rotatably driven by the ground during advancement of the tillage equipment.

In strip till operations wherein only a relatively narrow strip of soil is tilled to prepare a strip-type seed bed, it is a common practice to form the tilled strip into a long raised berm into which the seeds will ultimately be planted. In order to avoid destroying the berm when engaged by the reel, it is known in the art to use reels having generally concave bars so that the reel present a centrally tapered or wasted configuration that generally conforms to the humped cross-section of the berm as the reel straddles the berm with its wheels riding along opposite sides of the berm. However, in these strip till operations, and in conventional field finishing operations as well, there is a tendency for the reels to ball up and plug as wet stick soil pushes past the reel bars into the interior of the reel. This adversely affects the ability of the reel to perform its intended finishing operations and may necessitate costly and frustrating down time in order to clean out the plugged reel so that it will perform properly.

Accordingly, one important object of the present invention is to provide a tillage reel that is effective in reducing surface soil clods to the desired particle size while resisting the tendency to become packed with mud and trash materials during use in adverse conditions. Another important object of the invention is to provide a reel that is especially suited for use in strip till operations in which it is desirable to reduce clod size and pulverize the soil without destroying the integrity of the berm created by components that precede the reel.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
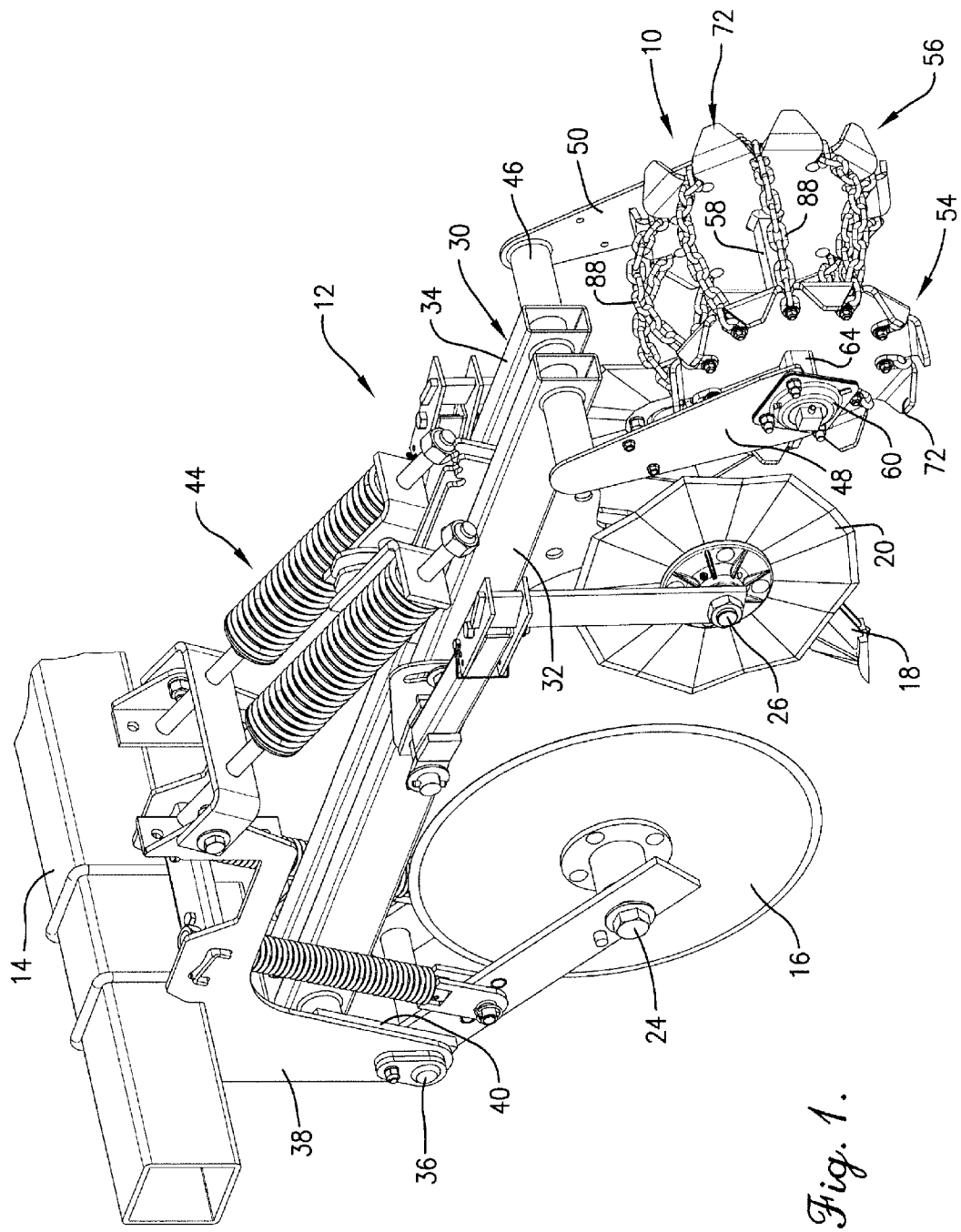
FIG. 1 is a left, rear isometric view of a tillage reel constructed in accordance with the principles of the present invention and used as part of a strip till row unit.

The tillage reel 10 in FIG. 1 is illustrated for purposes of example as part of a strip till row unit 12 which is, itself, one of a number of such units that collectively comprise a larger machine. Row unit 12 is mounted at its front end to a transversely extending tool bar 14 which, in turn, can be mounted to the three point hitch of a tractor (not shown) or serve as part of the frame of a pull-type piece of equipment. The principles of the present inventions are not limited to the type of equipment of which it is used although, as will be seen, reel 10 has particular utility for use as part of a strip till unit which creates a raised berm.

Although the strip till row unit 12 may take a number of different configurations, in the illustrated embodiment it includes, in addition to reel 10, a forwardmost, flat coulter 16 for cutting through trash and preparing a slit in the ground, a shank 18 behind and in alignment with coulter 16 for operating in the slit created by coulter 16 and fracturing the soil below the surface, and a pair of left and right, wavy coulters 20, 22 located a short distance behind shank 18 in symmetrical relationship therewith for building a berm from the soil that has erupted from the advancing shank 18. Wavy coulters 20, 22 converge toward one another at their rear extremities so as to converge the erupted soil inwardly toward the center line of the row unit in preparation for engagement by the reel 10. Of course, slicing coulter 16 is rotatable about a transverse axis as defined by a pivot bolt 24, while wavy coulters 20, 22 are rotatable about respective transverse axes defined by pivot bolts 26 and 28. The axes defined by pivot bolts 26, 28 are angled slightly forwardly due to the rearwardly converging orientation of wavy coulters 20, 22.

Among other things, row unit 12 includes a main, fore-and-aft extending beam assembly 30 comprised of a pair of side-by-side, fore-and-aft extending tubular beams 32 and 34. Beams 32, 34 are rigidly interconnected such that beam assembly 30 comprises a rigid, integral unit that can pivot upwardly and downwardly about a forwardmost transverse pivot 36 at the lower end of a bracket 38 by which row unit 12 is attached to toolbar 14. A pair of left and right, generally upright bars 40 and 42 are rigidly affixed to beams 32, 34 at their front ends and project downwardly therefrom to the pivot 36. A spring assembly 44 is connected between bracket 38 and beam assembly 30 to yieldably bias the latter in a downward direction. Inasmuch as shank 18, wavy coulters 20, 22 and reel 10 are supported by beam assembly 30, they are likewise yieldably biased in a downward direction by spring assembly 44.

At the rear of beam assembly 30, a cross tube 46 is rigidly affixed to beams 32, 34 and extends in transverse relation thereto, generally parallel with the toolbar 14. A pair of left and right arms 48, 50 are fixed to opposite ends of tube 46 and extend downwardly and rearwardly therefrom. The reel 10 is rotatably supported at the lower rear ends of arms 48, 50 for rotation about an axis that is transverse to the normal direction of forward travel of row unit 12 and is generally parallel to toolbar 14.

Reel 10 includes support structure broadly denoted by the numeral 52 and including a pair of opposed, axially spaced apart, left and right bulkheads or wheels 54 and 56. Wheels 54, 56 are welded or otherwise rigidly affixed to a solid, transversely rectangular axle 58 at spaced locations along the length thereof, the axle 58 comprising another part of support structure 52. Axle 58 projects outwardly beyond wheels 54, 56 in opposite directions and is rotatably received at its opposite ends within a pair of left and right bearings 60 and 62 secured to the lower rear ends of arms 48, 50. A pair of tubular spacers 64 and 66 (FIGS. 4 and 5) are received on axle 58 between bearings 60, 62 and the respective wheels 54, 56 to maintain reel 10 centered between arms 48 and 50.

Figure 5:
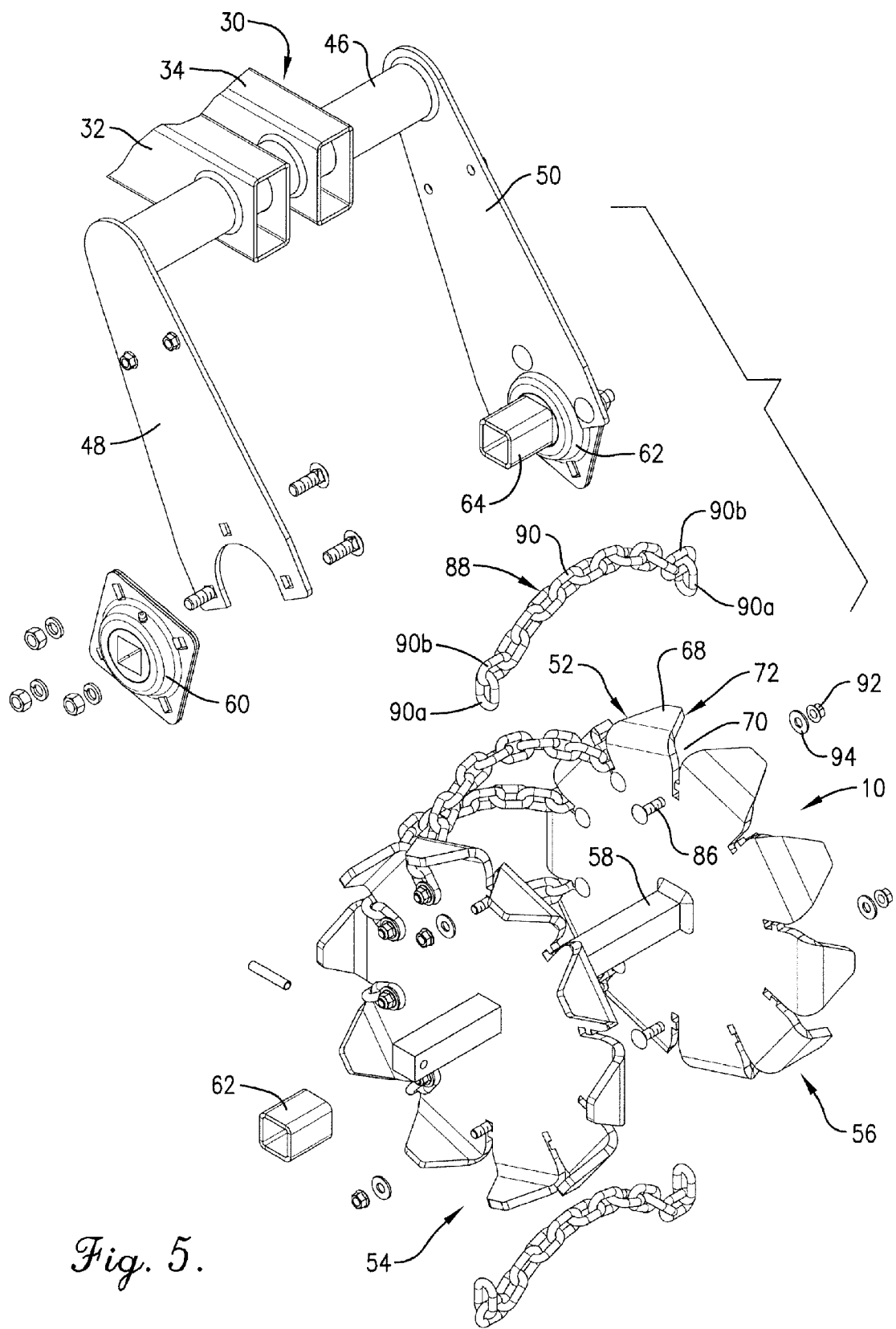
FIG. 5 is a left, rear, exploded isometric view of the reel.
Figure 6:
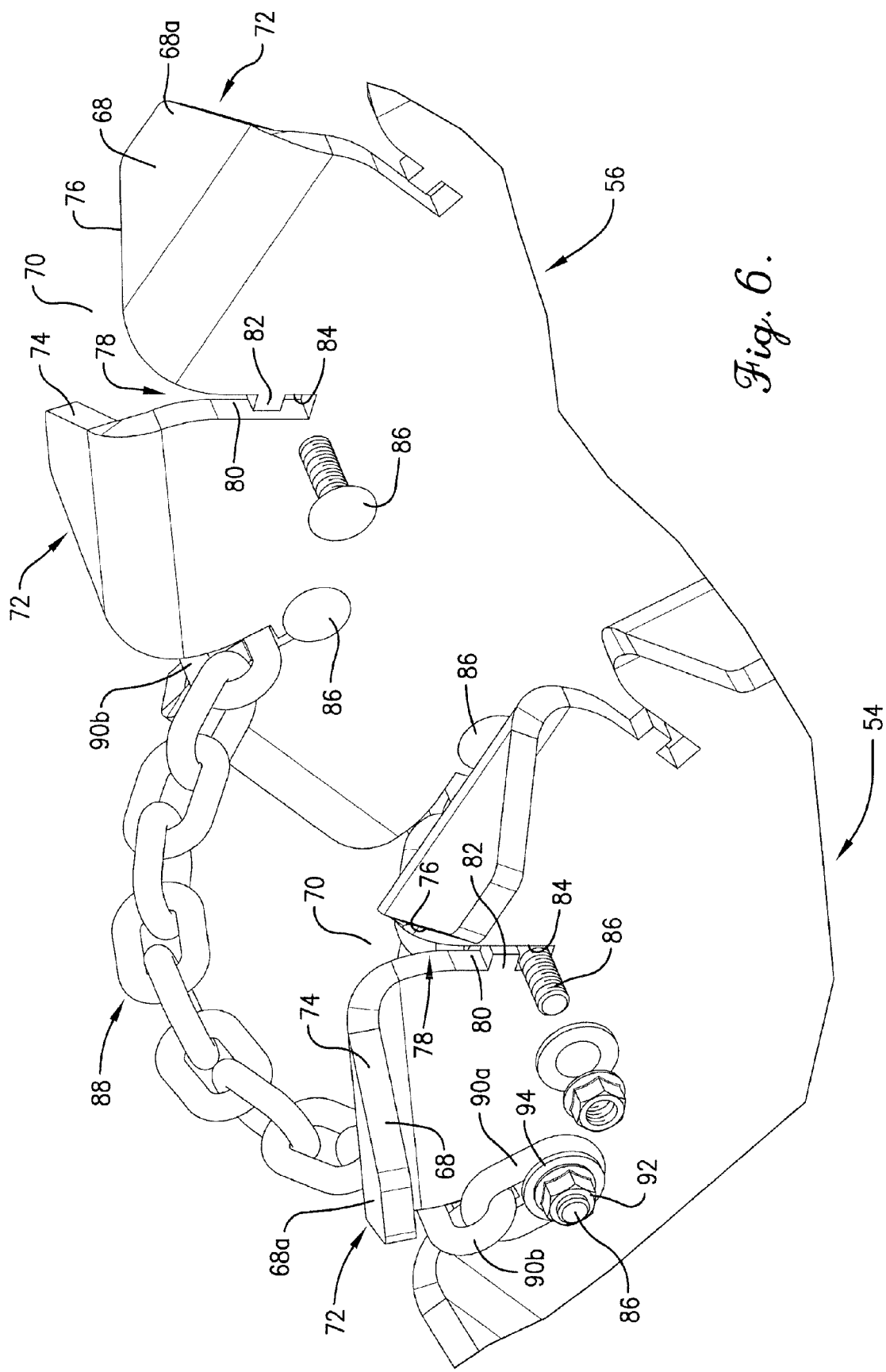
FIG. 6 is an enlarged, fragmentary isometric view of the periphery of the reel illustrating details of construction at that location.

Each wheel 54, 56 comprises a generally circular metal plate having an outturned lip 68 that presents a ground-engaging surface 68a extending generally parallel to the axle 58. Preferably, lip 68 is serrated to present a circumferentially extending series of generally triangular notches 70 therein (FIGS. 5 and 6). Notches 70 thus interrupt surface 68a in such a manner that lip 68 is discontinuous and presents a circumferential series of feet or pads 72 that engage the ground and support reel 10 for rolling movement therealong.

Each of the notches 70 is generally triangular shaped, with opposite side edges 74 and 76 on pads 72 that converge toward a generally inwardly disposed apex broadly denoted by the numeral 78. At apex 78, each notch 70 is extended to form a generally radially extending slit 80 (FIG. 6) in the wheel 54 or 56, each slit 80 having a generally rectangular tooth 82 that projects laterally inwardly into the slit from the adjacent edge of the slit. Tooth 82 extends almost across the entire width of slit 80 and is spaced above the radially inwardmost extremity of slit 80 so as to define a rectangular opening 84 that is sized to receive the flatted portion of a carriage bolt 86.

Reel 10 also includes a plurality of elongated flexible elements 88 that span the two wheels 54, 56 and are disposed at equally spaced locations around the periphery of reel 10. In one preferred embodiment, each flexible element 88 is in the nature of a link chain having a series of interconnected links 90 of open loop construction. It will be appreciated, however, that element 88 could take a variety of different forms including without limitation, a roller chain or a cable. In a most preferred embodiment, each element 88 comprises a hardened, welded metal link chain such as a link chain available from Watkins, Inc of Wichita, Kans. under the trademark and designation SYSTEM 7 TRANSPORT CHAIN.

Although each chain element 88 can be anchored to wheels 54, 56 in a variety of different ways, in the illustrated embodiment, each element 88 is so arranged that the endmost links 90a at opposite ends of element 88 lie flatly against the outside faces of wheels 54 and 56 in registration with the rectangular opening 84 such that carriage bolt 86 is received through the endmost link 90a. A nut 92 and washer 94 on carriage bolt 86 serve to clamp the endmost link 90a against wheel 54 or 56. Each endmost link 90a has a next adjacent, penultimate link 90b that is turned sideways from link 90a and is received within the confines of slit 80 so as to be trapped thereby. The remaining stretch of the element 88 between the two wheels 54, 56 is greater in length than the distance between wheels 54, 56 such that the chain stretch is loose and flexible, rather than taut. Consequently, each element 88 can bow out in a convex manner during certain portions of the rotation of reel 10, as well as bow inwardly in a concave manner during other portions of its rotation.

Operation

Figure 3:
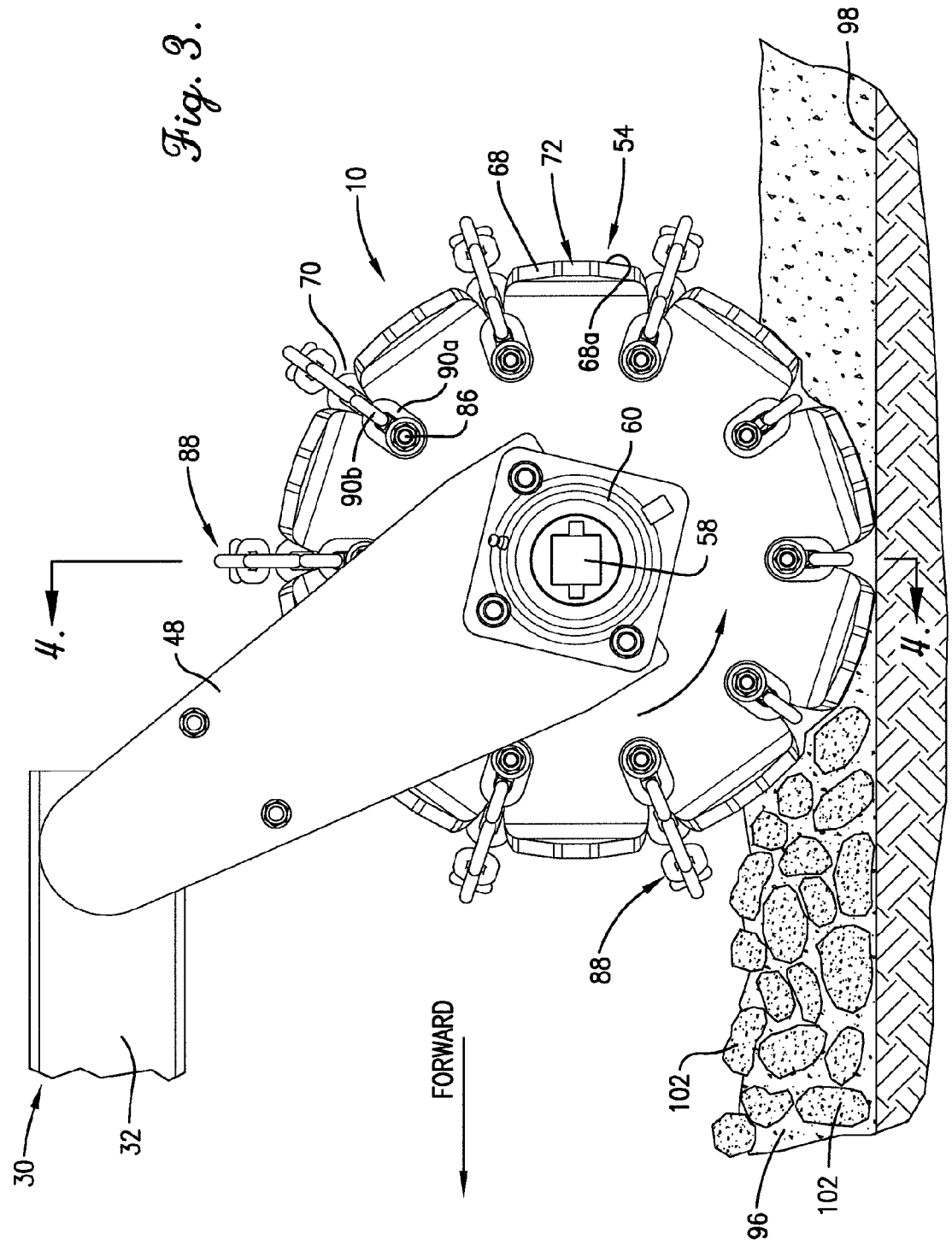
FIG. 3 is an enlarged, fragmentary side elevational view of the reel in use on a berm created by the strip till unit.
Figure 4:
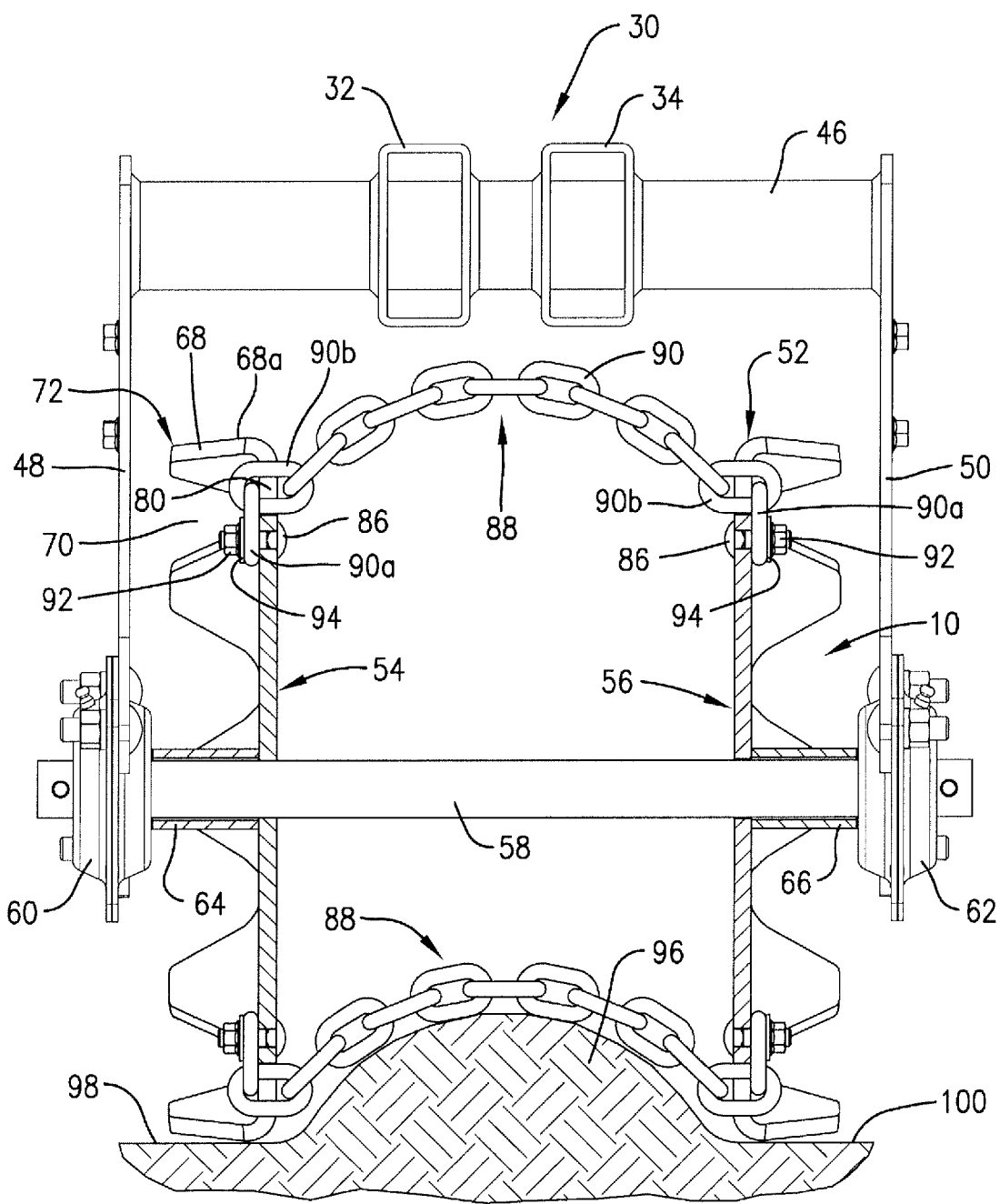
FIG. 4 is a vertical cross-sectional view through the reel taken substantially along line 4-4 of FIG. 3 and illustrating the manner in which flexible elements of the reel conform to the shape of the berm during field operations.

The operation and use of reel 10 is illustrated particularly in FIGS. 3 and 4. In those figures it will be seen that reel 10 straddles the berm 96 as it rolls along the ground with wheels 54 and 56 on opposite of berm 96. Thus, the outer surface 68a on pads 72 bears against and rides upon the unraised portions 98 and 100 of the ground surface at this time.

Figure 2:
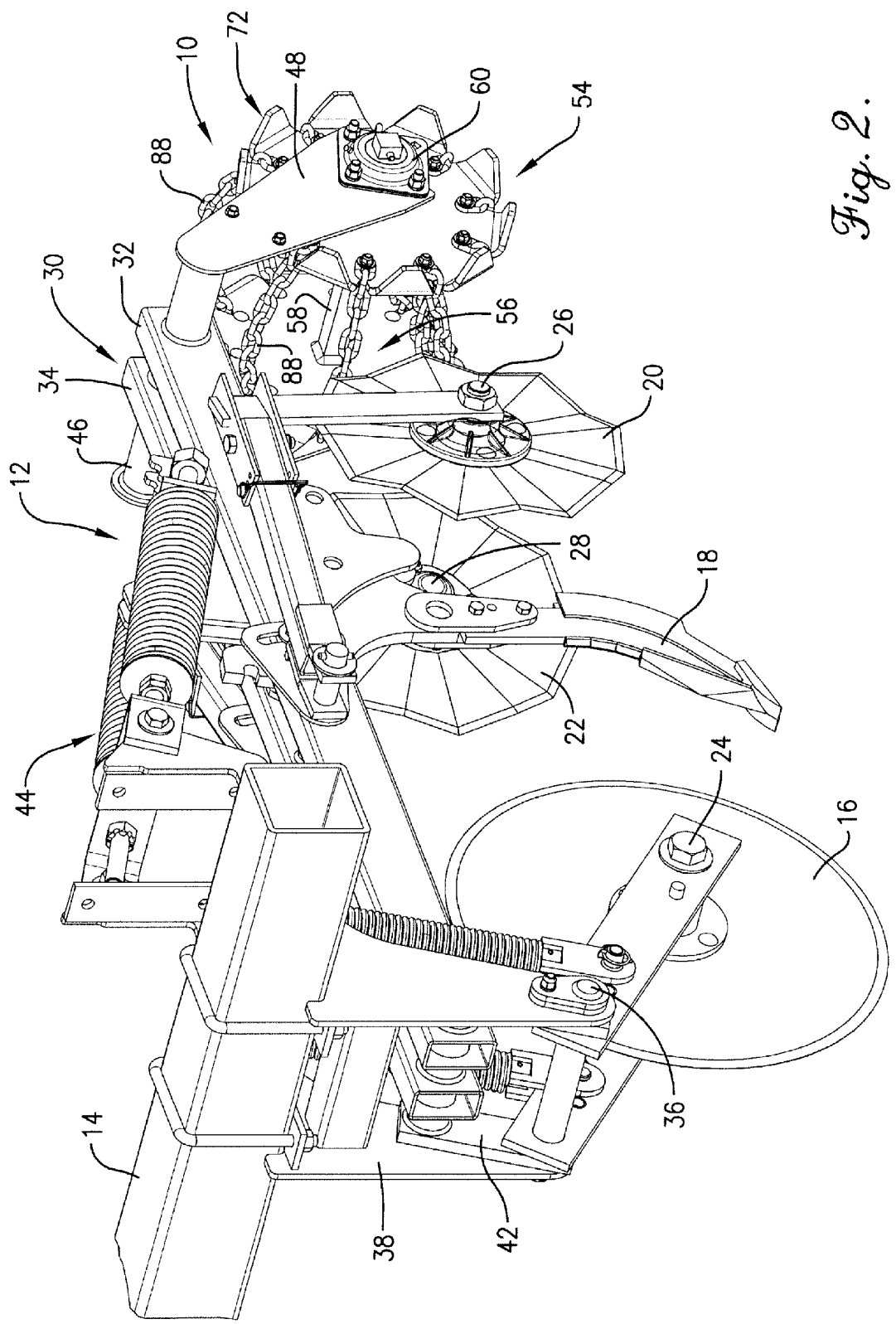
FIG. 2 is a left front isometric view of the tillage reel and other components of the strip till unit of FIG. 1.

As reel 10 rolls along the ground, driven thereby in a counter-clockwise direction viewing FIG. 3, the flexible elements 88 around the top half of the reel periphery are caused to bulge or bow outwardly by centrifugal force into the convexly arched configurations illustrated in FIGS. 3 and 4. This phenomena can also be seen, for example, in FIGS. 1, 2 and 6. Thus, as elements 88 whip downwardly around the lower front portion of the reel periphery at significant velocity, they slap against clods 102 in berm 96 that have been produced by the upheaval from shank 18 and cause such clods to fracture and break apart into smaller particles. Thus, the clods become pulverized and reduced in size to such an extent that much better seed-to-soil contact is assured in the seed bed than would otherwise be the case.

Notwithstanding the aggressive pulverizing action afforded by the flexible elements 88, the overall integrity and shape of berm 96 remains substantially unchanged by reel 10 due to the fact that, as elements 88 come into engagement with berm 96, they deflect radially upwardly and inwardly, conforming themselves to the shape of the berm as illustrated in FIG. 4. As elements 88 are lifted up off berm 96 around the back side of reel 10, they are once again free to flex outwardly by centrifugal force and assume their outwardly bowed configuration in preparation for the next impacting engagement with clods on the front side of the reel.

It is to be appreciated that the flexible nature of elements of 88 and their repetitious inward and outward flexing movement makes it difficult for wet, sticky soil to become trapped and packed within the interior of the reel. In this sense, the active elements 88 provide a type of self-cleaning action for the reel to maintain it in the best condition possible for carrying out its clod-pulverizing action.

Moreover, it is to be appreciated that the serrated nature of the lip 68 on each wheel 54, 56 helps prevent soil buildup on the outer surfaces 68a of wheel 54 and 56 as they roll along the ground. Although there is no movement of pads 72 on each lip 68 relative to one another, having the pads 72 separated by notches 70 also helps render these portions of the reel essentially self-cleaning.

Alternative Embodiment

Figure 7:
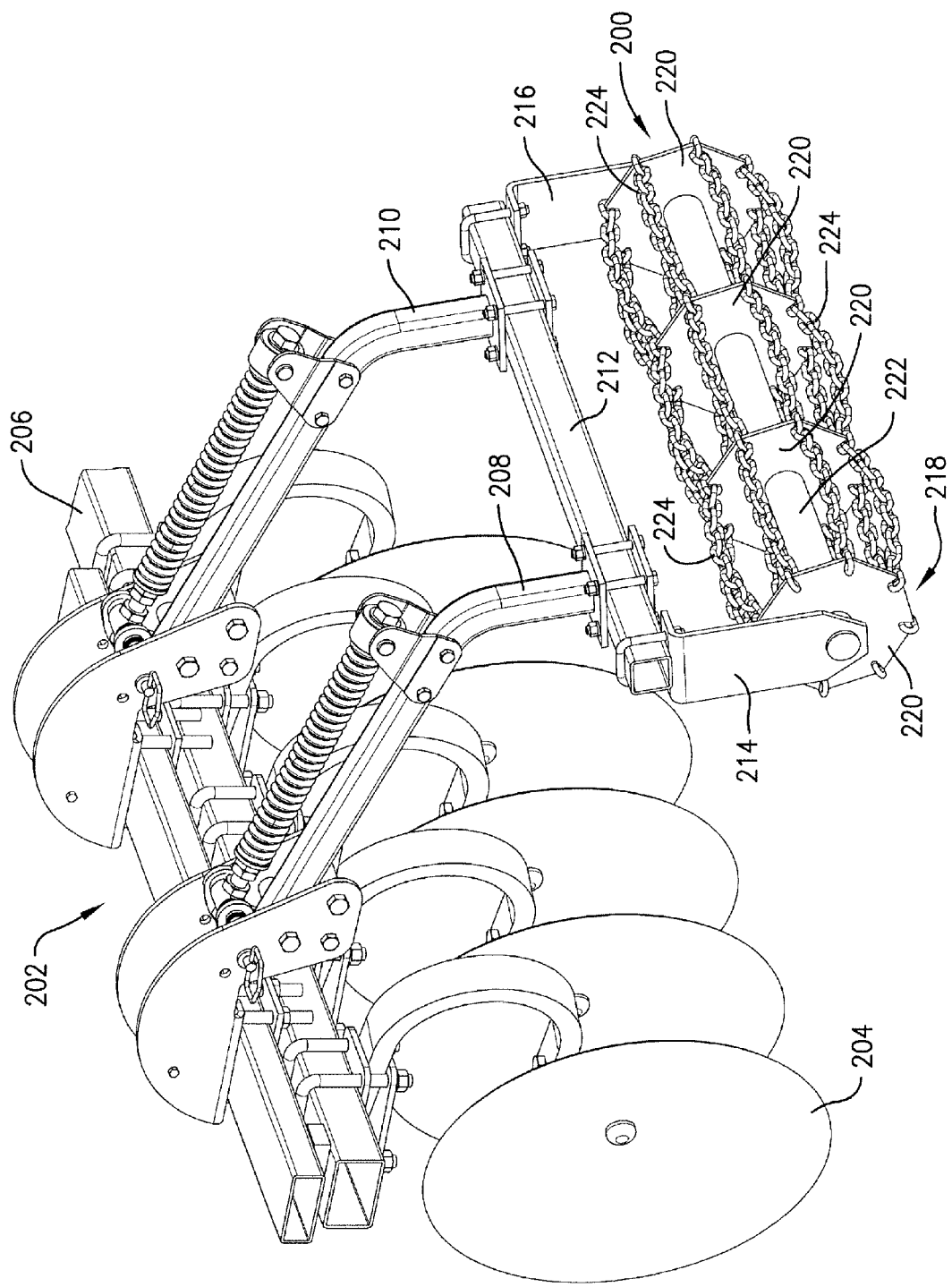
FIG. 7 is a left, rear isometric view of an alternative embodiment of tillage reel in accordance with the present invention having particular utility for field finishing operations where no strip till berm is present.

FIG. 7 illustrates a second embodiment of a tillage reel 200 in accordance with the principles of the present invention. In this embodiment reel 200 is especially adapted for use as part of a field finishing implement broadly denoted by the numeral 202 wherein a number of the reels 200 are utilized behind discs 204 or other tillage components to break up clods and prepare a smoother seed bed. In this particular embodiment, reel 200 is not especially designed to be used on the berms created by strip till operations.

Reel 200 is supported in any suitable manner on the frame 206 of implement 202, such as by a pair of rearwardly extending arms 208 and 210, a cross bar 212 at the lower rear ends of arms 208, 210, and by a pair of downwardly extending arms 214 and 216 at opposite ends of cross bar 212. Reel 200 is rotatably supported at the lower ends of arms 214, 216 for rotation about an axis that is transverse to the normal direction of forward travel of implement 202.

Reel 200 includes support structure broadly denoted by the numeral 218 and including a series of bulkheads or wheels 220 disposed at spaced apart locations along the length of the axis of rotation of reel 200. Wheels 220 are fixedly attached to a common axle 222 that extends the full length of reel 200 and projects in opposite directions somewhat beyond the endmost wheels 200 for bearing support at the lower ends of arms 214, 216. Axle 222 thus comprises a part of support structure 218.

Reel 200 further comprises sets of elongated flexible elements 224 spanning the distance between adjacent pairs of wheels 220 and spaced circumferentially about the periphery of the reel. Opposite ends of each flexible element of 224 are secured to respective wheels 220 in any suitable manner, including, but not limited to, the slit and carriage bolt arrangement described with respect to the first embodiment. One arrangement is for a single length of flexible element 224 to extend the entire length of reel 200 and to simply be anchored to interior wheels 220 by appropriate means at those locations. Thus, in the illustrated embodiment, for example, reel 200 has a pair of opposite end wheels 220 and a pair of interior wheels 220 so that each full length element can be effectively subdivided into three shorter lengths by anchoring the element at the two interior wheels 220 as well as the two outboard wheels 220. Each stretch of the flexible element has a length that is somewhat greater that the distance between the two wheels 220 to which it is attached such that each stretch can flex inwardly and outwardly between outwardly and inwardly bowed configurations similar to that of the first embodiment.

In one preferred form of the reel 200, each of the flexible elements 224 comprises a length of link chain, preferably constructed of metal. It is to be understood, however, that the flexible elements could be constructed from other devices such as cable or roller chains.

It will be noted that the wheels 220 of reel 200 are not provided with outturned peripheral lips as in the first embodiment, although wheels 220 could be constructed in a manner similar to the wheels 54 and 56 of the first embodiment if desired. In any event, it will be appreciated that as the flexible elements 224 whip around the peripheral reel 200 and into engagement with the ground, they impart sharp impacting blows to clods and large particles of the soil so as to fracture, fragment and pulverize clods much in the same manner as with respect to the first embodiment. Although flexible elements 224 can flex inwardly as they engage the ground around the lower periphery of reel 200, there is less need in this type of operation for elements 224 to conform to the ground contour since there is no berm involved. The flexible nature of the elements 224 helps assure that reel 200 functions in an essentially self-cleaning manner to prevent reel 200 from becoming packed with mud and soil.

The inventor hereby states his intent to rely on the Doctrine of Equivalents to determine and assess the reasonably fair scope of his invention as pertains to any apparatus not materially departing from but outside the literal scope of the invention as set out in the following claims.

What is claimed is:

1. A tillage method comprising the steps of:

working the soil with a tillage tool that dislodges and leaves clods of soil behind the tool as the tool is moved through the soil; and breaking up the clods using a ground-driven reel behind the tool that is formed in part by a plurality of axially spaced apart, ground-engaging members and a plurality of elongated, flexible, clod-engaging elements that extend generally axially of the axis of rotation of the reel and are spaced about the periphery of the reel between adjacent ones of the ground-engaging members, each of said flexible elements comprising a stretch spanning said adjacent members that is longer than the distance between the adjacent members such that the element stretch is loose and deflects radially upon rotation of the reel, said flexible elements being selected from a group consisting of lengths of cable and lengths of chain with interconnected links.

2. A tillage method as claimed in claim 1, said tool comprising a shank, and said reel being disposed in on-center alignment with said shank.

3. A tillage method as claimed in claim 1, said chain being made from metal.

4. A tillage method as claimed in claim 1, said tool comprising a shank.

5. A tillage method as claimed in claim 1, each of said flexible element stretches deflecting radially upwardly and inwardly upon engagement with the clods.

6. A tillage machine comprising:

a ground-working tillage tool adapted to dislodge and leave clods of soil behind the tool as the tool is moved through the soil; and a ground-driven, rotatable reel disposed behind said tool in such a position that the reel engages clods left by the tool, said reel including support structure comprising a plurality of axially spaced apart, ground-engaging members, said ground-engaging members being rotatable about a transverse axis as the reel is advanced in a forward direction while engaging the ground, said reel further including a plurality of elongated flexible elements carried by said support structure and spaced circumferentially about the periphery of the reel for engaging and breaking up the clods as the reel rolls along the ground, each of said flexible elements comprising a stretch spanning adjacent ones of the ground-engaging members that is longer than the distance between the adjacent members such that the element stretch is loose and flexible, such that each flexible element is configured to generally deflect radially upon rotation of the reel, said flexible elements being selected from a group consisting of lengths of cable and lengths of chain with interconnected links.

7. A tillage machine as claimed in claim 6, said flexible elements each comprising a length of chain, said ground-engaging members comprising a pair of axially spaced apart, ground-engaging wheels, said lengths of chain spanning said wheels.

8. A tillage machine as claimed in claim 7, said links being constructed from metal.

9. A tillage machine as claimed in claim 7,
each said length of chain having a pair of opposite ends,
one end of said length of chain being anchored to one of said wheels and the other end of said length of chain being anchored to the other of said wheels.

10. A tillage machine as claimed in claim 6,
said flexible elements each comprising a length of chain,
each of said lengths of chain extending generally parallel to the axis of rotation of the reel.

11. A tillage machine as claimed in claim 7,
each wheel of said pair of wheels comprising a generally circular plate having a marginal periphery that is outturned to present a lip having a ground-engaging surface that extends generally parallel with the axis of rotation of the reel.

12. A tillage machine as claimed in claim 11,
said lip being serrated to present a circumferential series of notches therein.

13. A tillage machine as claimed in claim 12,
said notches being generally triangular with a pair of opposite edges converging toward an inwardly disposed apex.

14. A tillage machine as claimed in claim 13,
said apex of each notch having a slit that is sized to receive and contain a link of the chain when the link is turned on edge,
said chain having another link on an outboard face of the plate that is turned at right angles to the link in the slit and is secured to said outboard face.

15. A tillage machine as claimed in claim 14,
said links being constructed from metal.

16. A tillage machine as claimed in claim 6,
said flexible elements each comprising a length of chain,
said links being constructed from metal.

17. A tillage machine as claimed in claim 6,
said ground-engaging members comprising a series of axially spaced apart wheels along the length of the reel,
adjacent wheels in the series having a plurality of said elongated flexible elements spanning the adjacent wheels and spaced circumferentially about the periphery of the reel.

18. A tillage machine as claimed in claim 17,
said flexible elements each comprising a length of chain,
said chains being constructed from metal.

19. A tillage machine as claimed in claim 6,
each of said flexible element stretches deflecting radially upwardly and inwardly upon engagement with the clods.

\* \* \* \* \*